United States Patent [19]

Spangler

[11] Patent Number: 5,337,260
[45] Date of Patent: Aug. 9, 1994

[54] METHOD FOR CALIBRATING A SINGLE POINT IMPACT SENSOR

[75] Inventor: Leland J. Spangler, Ann Arbor, Mich.

[73] Assignee: Ford Motor Company, Dearborn, Mich.

[21] Appl. No.: 89,179

[22] Filed: Jul. 12, 1993

[51] Int. Cl.⁵ .............................................. G06F 15/20
[52] U.S. Cl. ................................. 364/571.02; 73/488; 364/424.05; 364/571.04
[58] Field of Search ...................... 73/488; 364/424.05, 364/556, 571.02, 571.04

[56] References Cited

U.S. PATENT DOCUMENTS

| | | | |
|---|---|---|---|
| 4,336,718 | 6/1982 | Washburn | 364/566 X |
| 4,669,052 | 5/1987 | Bianco | 364/571 |
| 5,014,229 | 5/1991 | Mofachern | 364/571.04 |
| 5,060,504 | 10/1991 | White et al. | 73/1 D |
| 5,103,667 | 4/1992 | Allen et al. | 73/1 D |
| 5,164,901 | 11/1992 | Blackburn et al. | 364/424.05 |

Primary Examiner—Edward R. Cusimano
Attorney, Agent, or Firm—Roger L. May; Richard D. Dixon

[57] ABSTRACT

A method for calibrating an impact sensor enables calibration to take place after sensor manufacture is completed. During calibration, the sensor undergoes an acceleration while vehicle specific calibration values are programmed into sensor memory for different incremental rates of acceleration. Calibration verification checks to verify that the relationship between acceleration and sensor output is linear. The calibration also includes a hysteresis test by comparing output values when incrementally increasing the acceleration to corresponding acceleration values while incrementally decreasing acceleration. The calibration method may also include calculating a response time for a self-test circuit that can be stored in memory and later used during self-tests of the sensor.

18 Claims, 4 Drawing Sheets

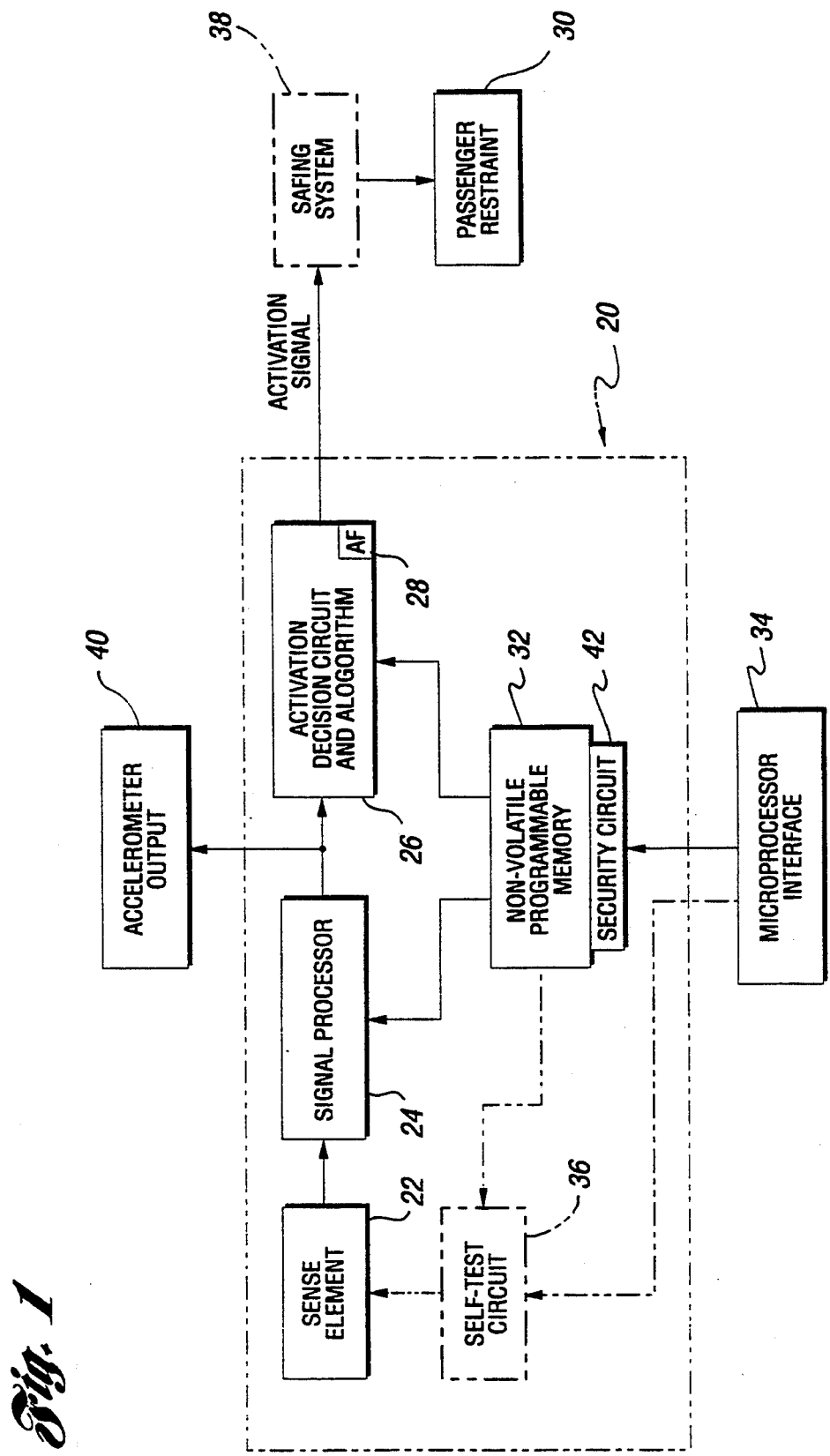

METHOD FOR CALIBRATING A SINGLE POINT IMPACT SENSOR

TECHNICAL FIELD

This invention relates generally to a method for calibrating impact sensors in a vehicle passenger restraint mechanism and, more particularly, to a method for calibrating impact sensors having accelerometers which detect the occurrence of a high vehicle impact condition.

BACKGROUND ART

Passive restraint systems such as air bags or automatic seat belt tensioners have experienced increased usage in vehicles to protect passengers during frontal collisions. These types of occupant protection and safety devices require no extra action by the passenger to achieve protection. Rather, the passive restraint automatically activates in the event of an activation worthy impact event. To determine if a given event is activation worthy, an impact sensing system in the vehicle detects impacts and discriminates between activation worthy and nonactivation worthy impacts.

One type of impact sensing system uses a plurality of threshold switches in the front region of the vehicle. These switches send a signal for inflating an air bag if a high impact event is severe enough to close the switches. Mechanical sensor-based systems of this type usually rely on sensor redundancy to minimize the negative effects of any sensor malfunction which may occur. This requires a large number of switches within the vehicle, each of which must be calibrated separately, increasing the overall complexity of the impact sensing system and its calibration process. To ensure proper functioning, the threshold switches must be located in strategic places in the vehicle where they have the best opportunity to detect and discriminate between various types of impacts. Determining these locations during calibration of the impact sensing system requires extensive impact testing and studying of impact effects on the vehicle to determine the best placement for the threshold switches.

Another type of impact sensing system uses a single point impact sensor instead of multiple switches. This type of sensing system has an accelerometer located in the passenger compartment of the vehicle that constantly monitors the vehicle's acceleration and senses any sudden deceleration. The output of the accelerometer is continuously analyzed to determine if and when deceleration occurs and if the deceleration is caused by an impact that is severe enough to require activation of the air bag or other passenger restraint. This type of impact sensing system is easier to calibrate because the sensor does not involve a large number of parts that need to be calibrated individually. Only the accelerometer and the discrimination circuitry need to be calibrated.

Most sensors require application of a measurand on the sensor during calibration. A measurand is defined as the type of value that the sensor is designed to measure. For the impact sensor, the measurand is an acceleration value, but a measurand can be any type of physical or chemical phenomenon. Calibration is one of the most expensive and time-consuming steps in sensor manufacture because application of the measurand requires a high degree of precision.

In many impact sensing systems, lasers trim thin film resistance networks in the sensor during manufacture to achieve proper calibration. However, this type of calibration must take place as an intermediate step in the manufacturing process, not the final step, since the sensor package must still be open during calibration to give the laser beam access to the resistor network. The measurand must then be applied to this incomplete device to calibrate it. After laser trimming, the lid is attached to completely enclose the sensor, and the measurand is applied a second time to confirm the accuracy of the sensor calibration.

This method requires additional manufacturing steps to take place after the initial calibration, such as solder seal, epoxy core, or burn-in. Consequently, the sensor undergoes additional stresses after calibration through these subsequent manufacturing processes. The stresses undermine the integrity of the first calibration and increase the likelihood of damaging the sensor prior to a final sensor confirmation test.

Several sensor calibration methods have been developed to minimize the problems associated with conventional calibration processes. U.S. Pat. No. 4,669,052 to Bianco describes a method and apparatus for calibrating a sensor output that eliminates conventional trimming and other internal calibration techniques that change the physical characteristics of the sensors.

This calibration method is accomplished by providing a database, which is empirically prepared for each particular sensor, to relate the sensor output to known environmental influences. The database is then stored in the sensor memory. Slope values, which indicate the slope between various test points, can also be calculated and stored in the database to define the relationships between external event values and sensor output values. With this type of calibration, however, the empirically obtained data is assumed to be correct and is used as the reference point for subsequent measurements. There is no verification provision in this calibration method to conduct a final test after calibration to compare the sensor output with a fixed standard to ensure that the calibrated output of the sensor is indeed the desired output.

SUMMARY OF THE INVENTION

It is therefore an object of the present invention to provide a method for calibrating a sensor that does not require an intermediate calibration step during sensor manufacture.

It is another object of the present invention to provide a method for calibrating a sensor that enables comparison of the calibrated output of the sensor with a fixed standard of acceptable output values.

Accordingly, the calibration method of the invention relates to integration of impact sensor calibration and the calibration of restraint activation decision circuits. The impact sensor calibrated by the method of the invention preferably has a capacitive sense element that varies in capacitance as a result of variations in acceleration. These variations in the capacitance difference of the sense element are converted by a signal processor to an output signal with variations in a continuous analog voltage, or preferably in the pulse density of a digital pulse train. An activation decision circuit evaluates and interprets the outputs signal. If it is a pulse train, the decision circuit counts the number of pulses in a fixed time period at different time intervals; if the number of pulses within a selected time interval exceeds a predetermined threshold, the sensing system indicates that an activation worthy event has occurred and activates the passive restraint.

The calibration method of the invention is conducted after sensor manufacture is completed. Preferably, a centrifuge accelerates the sensor incrementally up to a predetermined maximum value. At each increment of acceleration, calibration values are entered into the sensor memory. These values are used to calibrate the sensor output. Preferably, the acceleration is applied to the sensor while it is connected to the circuitry that loads the digital words into the memory.

Calibration of the activation decision circuit is achieved by preloading the counters and timers in the activation decision circuit with digital values that allow the decision algorithm in the circuit to properly compute the desired output.

After sensor calibration is complete, the calibration is verified by incrementally increasing the acceleration from zero, measuring the output signal, i.e., the pulse density of the pulse train, and verifying that a substantially linear relationship exists between the acceleration and pulse density.

Hard wired security codes are also provided in the sensor to prevent inadvertent changing of the stored digital words through soft errors such as radiation. The codes also prevent tampering with the calibration or stored digital values by unauthorized persons.

BRIEF DESCRIPTION OF THE DRAWINGS

FIG. 1 is a block diagram of an accelerometer hardware circuit applicable for use with the method of the present invention;

BEST MODE FOR CARRYING OUT THE INVENTION

Figure 2A:
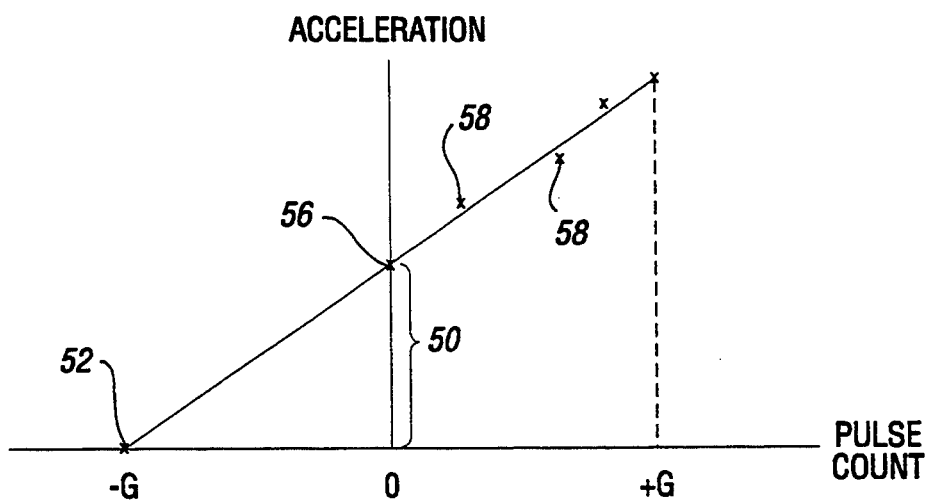
FIGS. 2a and 2b are graphs of the acceleration applied to the sensor versus the pulse count produced by the signal processor, in accordance with the present invention.

FIG. 1 is a block diagram illustrating a single point impact sensing system, for sensing and analyzing acceleration experienced by a vehicle. The impact sensing system has an impact sensor 20 that is calibrated by the method of the present invention. The impact sensor 20 has a sense element 22 which responds to acceleration; preferably a type which deflects or otherwise responds physically during acceleration. The sense element 22 can be any type that is mechanically responsive and can vary its response and resulting signal based on the rate of acceleration. Preferably, the sense element 22 is a capacitance sense element.

The output of the sense element 22 is sent to a signal processor 24 that converts the sense element output into a form that can be easily analyzed. This signal processor 24 preferably performs a capacitance-to-pulse count conversion that converts variations in the signal from the sense element 22 to variations in the pulse density of a modulated digital pulse train signal; but also other signal outputs are commonly used in the signal processor 24 in impact sensors 20. Preferably, the number of pulses in a predetermined time interval is proportional to the acceleration sensed by the sense element 22.

The impact sensor 20 also includes an activation decision circuit and algorithm 26, which receives the pulse train, or other output signal, from the signal processor 24. The activation decision circuit 26 has an hierarchy of counters and timers that monitor the pulse density of the digital pulse train signal according to a set of predetermined parameters to determine if the signal is indicative of a passenger restraint activation worthy event. The pulse density is defined as the number of pulses which occur per unit time and is preferably proportional to the average acceleration over the unit time in an approximately linear fashion. The activation decision circuit 26 also has an activation flag (AF) 28 that changes state if the number of pulses during a given time period exceeds a threshold value. The output from the signal processor 24, then, indicates the occurrence of a high impact, i.e., an activation worthy event. This change of state in the activation flag 28, in turn, activates the passenger restraint 30 by sending out an activation signal.

A non-volatile programmable memory 32 is preferably placed in the sensor 20 and made accessible through a microprocessor interface 34. The threshold parameters for the activation decision circuit 26 are preferably stored in the non-volatile programmable memory 32. The non-volatile programmable memory 32 includes a tamper-proof security circuit 42 such that any information passing through the microprocessor interface 34 must electronically pass through the security circuit 42 using a sequence of hard-wired access codes. This circuit 42, then, prevents inadvertent changing of any digitally stored memory through soft errors, such as electromagnetic interference or ionizing radiation. Thus, the security circuit 42 prevents corruption of the sensor 20 or malfunctions and also prevents tampering with the calibration or stored digital values by unauthorized persons.

Optionally, a self-test circuit 36, and safing system 38, may also be included in the sensor 20. The self-test circuit 36 is programmed to periodically test the sensor 20, such as at engine start-up, while the safing system 38 assures that the passenger restraint 30 will not activate during the self-test by blocking the activation signal path during the self-test.

The signal processor 24 has an adjustment circuit that analyzes the movement of the sense element 22 and generates the digital pulse train signal. The sense element 22 preferably generates an output voltage that predictably varies with changes in acceleration. The pulse density of the pulse train is modulated as the output voltage varies. Ideally, the number of pulses per unit time is linearly proportional to the acceleration sensed by the sense element 22.

Prior to adjustment, the number of pulses in the pulse train at zero Gs (indicating zero acceleration) is equal to an offset value 50 which is slightly different for each sensor 20 due to factors such as manufacturing tolerances and individual component variations, as shown in FIG. 2a. The number of pulses in the pulse train at this stage is greater than the offset value 50 if the sensor 20 is experiencing positive G-force, i.e., positive acceleration, up to a maximum positive G-force (+G), and less than the offset value 50 if the sensor 20 is experiencing a negative G-force, i.e., negative acceleration, with optimally zero pulses per unit time at a full scale negative G-force (−G) 52.

Figure 2B:
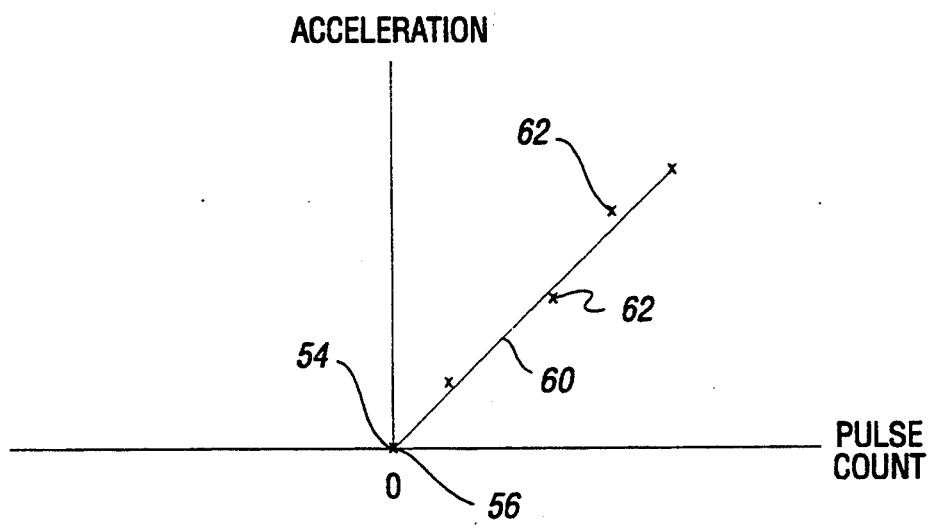

Analysis of the pulse train would be greatly simplified if zero acceleration were equated with zero pulses per unit time. Thus, an adjustment circuit, within the signal processor 24, is able to modify the pulse density of the pulse train by an amount equal to the offset 50 to make the pulse train optimally flat at zero acceleration 54, as shown in FIGS. 2a and 2b.

In the activation decision circuit and algorithm 26, shown in FIG. 1, a hierarchy of timers and counters monitor and evaluate the pulse density of the pulse train. Since changes occur only in the pulse count per unit time in the pulse train, the activation decision circuit 26 only needs to measure the number of pulses in a given time period and not the pulse width or the frequency of the pulse train. The activation decision circuit 26 evaluates and interprets the pulse train by counting the number of pulses in a fixed time interval at different time intervals. Preferably, a flag is set each time the number of pulses exceeds a certain threshold within that time interval. If the number of flags set within the selected time interval exceeds a predetermined limit, an activation signal is generated to actuate the passenger restraint 30.

Proper operation of the signal processor 24 and the activation decision circuit 26 is determined through a calibration and verification method which is the subject of the present invention. Calibration of the signal processor 24 involves determining the offset and gain of the signal processor 24 and programming the offset and gain values into the nonvolatile programmable memory 32 through the microprocessor interface 34 to force an optimally flat pulse train signal response at zero acceleration 54, as shown in FIG. 2b. This programming will account for variations between sensors due to manufacturing tolerances. Calibration of the activation decision circuit and algorithm 26 involves programming vehicle specific parameters into memory 32, through the microprocessor interface 34, which enables the same impact sensor 20 to be used on different vehicles having different passenger restraint requirements. Verification occurs after calibration of the impact sensor 20 and is used to verify the performance of the sensor.

Figure 3A:
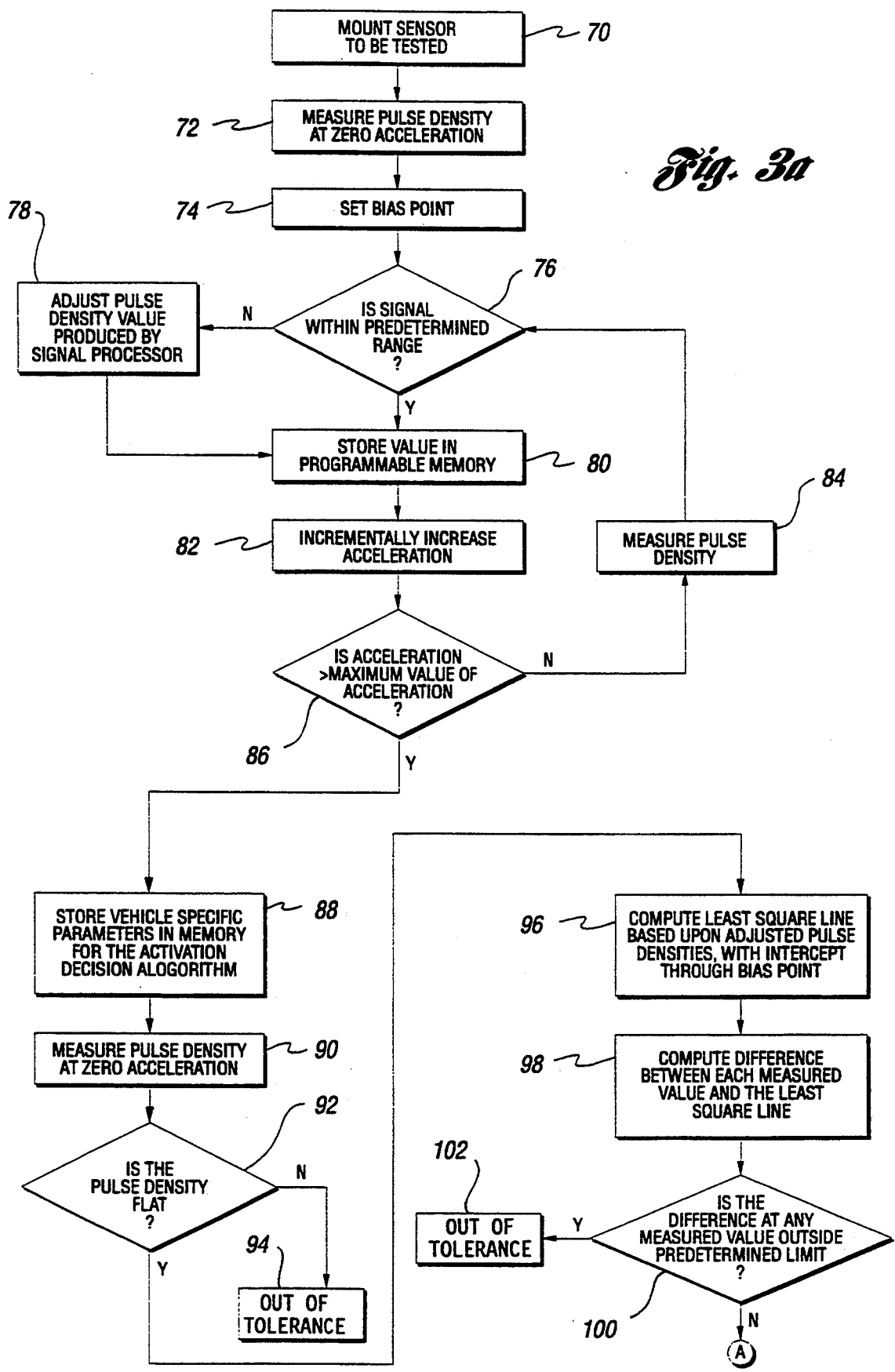
FIGS. 3a and 3b are a flow chart of the method of calibration of a sensor in accordance with the present invention.
Figure 3B:
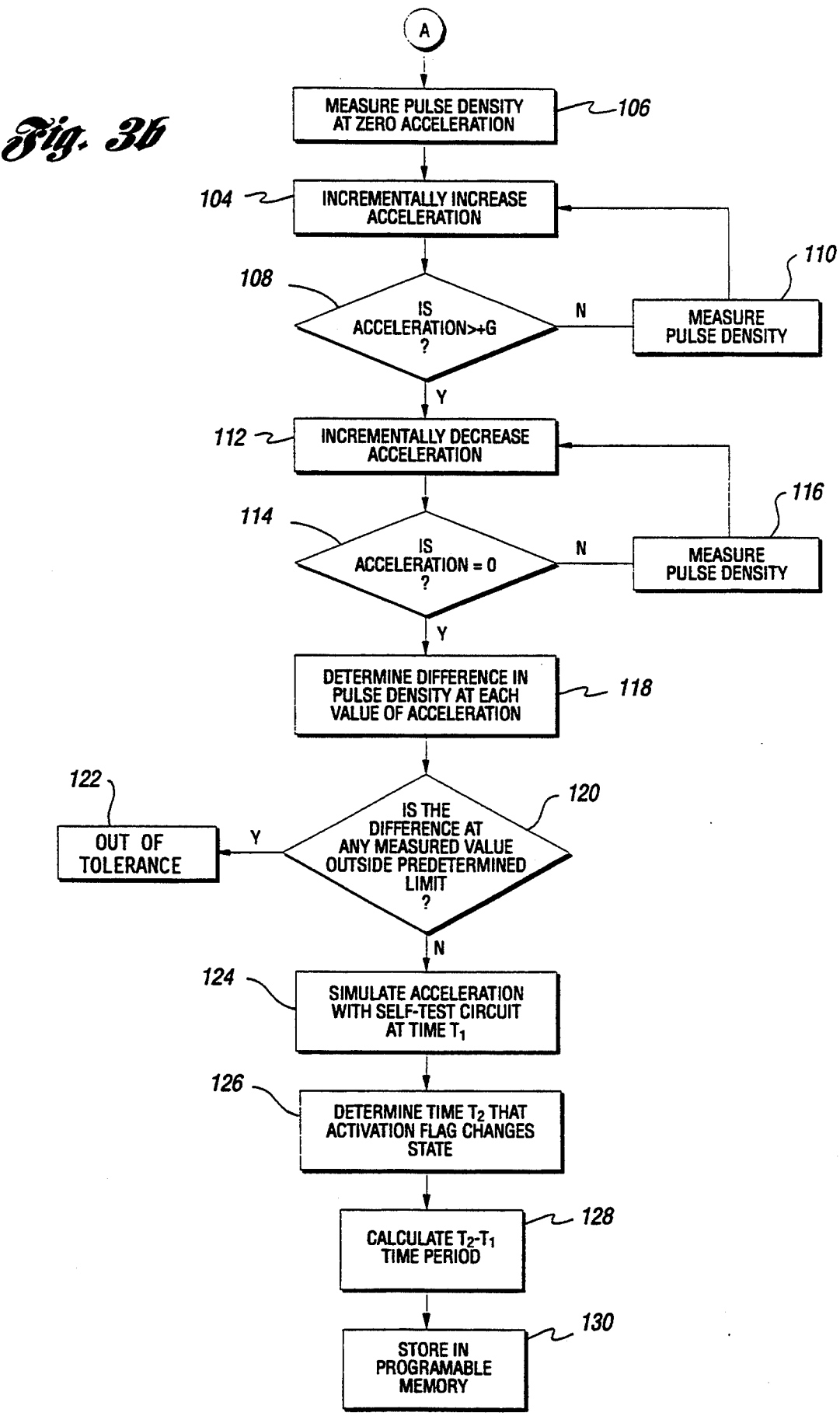

The method of calibration for each sensor is shown in FIGS. 3a and 3b. To calibrate the signal processor 24, the completely assembled impact sensor 20 is subjected to an acceleration. This acceleration is preferably accomplished by using a centrifuge, but a shaker or other acceleration device can be used. The sensor 20 to be tested is mounted in the acceleration device 70, and the pulse density is measured at zero acceleration 72 by collecting it from an acceleration output interface 40, as shown in FIG. 1. This measurement will determine the bias point, which can now be set 74. If the pulse density is not substantially zero 76, the pulse density is adjusted 78, and this value is programmed into the memory 80. At block 76, if the signal is within the predetermined range, the value is stored or programmed in the programmable memory as indicated at block 80.

The acceleration rate is incrementally increased 82 and the pulse density is measured 84, up to a predetermined maximum value of acceleration 86. The relationship between the acceleration rate and the pulse density of the pulse train is then recorded at each increment to create test points 58, as shown in FIG. 2a. The offset and gain of the signal processor 24 can then be determined from this recorded information and written to memory 80, preferably while the sensor 20 is still undergoing the acceleration. Thus, the sensor 20 can undergo final verification immediately after calibration since the sensor does not need to be removed from the centrifuge. This reduces fallout and damage and results in tighter distribution of the final specification of the sensor.

The activation decision circuit 26 is calibrated by storing vehicle specific parameters in memory 88. This is done if the acceleration is greater than the maximum value of acceleration, as indicated at block 86. This calibration is accomplished by preloading counters and timers in the memory 32 with digital values that allow the decision algorithm 26 to properly analyze the pulse train and discriminate between activation worthy and non-activation worthy events. Preferably, the values stored in memory 32 are equal to the total size of the register minus the desired digital value. This way, the output is enabled when the desired counter or timer value completely fills the memory register.

The sensor calibration is verified by first checking the pulse density of the signal processor output at zero acceleration 90. The pulse train should be virtually flat at zero acceleration 92, or the sensor is out of tolerance 94.

Next, the sensor 20 is checked to make sure that a linear relationship exists between the rate of acceleration and the pulse density of the pulse train. The rate of acceleration of the impact sensor 20 is then increased by predetermined increments and the pulse density is measured at each increment to establish new test points 62, as shown in FIG. 2b. These steps provide data that shows the relationship between the rate of acceleration and pulse density for this particular sensor 20 at the various new test points 62. If the pulse density is flat as indicated at block 92, the logic flows to block 96. This relationship is then compared to a linear intercept through the bias point 96 to compute the linearity error at each new test point. The error is computed by determining the difference between each measured value and a least squares line 98. The least squares line 60 and bias point 56 are shown in FIG. 2b. If the absolute value of the linearity error exceeds a predetermined tolerance 100, the impact sensor 20 is out of tolerance 102.

An additional test for hysteresis characteristics can also be conducted. If the difference at any measured value is not outside the predetermined limit as indicated at block 100, block 106 of FIG. 3b is entered. This test involves taking each impact sensor 20 and incrementally increasing the rate of acceleration 104 beginning at zero 106, up to a specific maximum value (+G) 108 while measuring the pulse density at each incremental step 110; if the acceleration is greater than the specific maximum value (+G) then block 112 is entered; then incrementally decreasing the acceleration 112 back to zero 114 while again measuring the pulse density at each incremental step 116. If the acceleration is equal to zero as indicated at block 114, then block 118 is entered. A hysteresis error is calculated by subtracting corresponding pulse density values at each corresponding incremental rate of acceleration 118. If the difference at any incremental step of acceleration is outside a predetermined limit 120, then the sensor is out of tolerance 122.

A further calibration test can also be conducted for an impact sensor 20 that has a self-test circuit 36. If the difference at any measured value is not outside the predetermined limit as indicated at block 120, then block 124 is entered. The time ($T_1$) at which the self-test circuit 36 simulates a crash-worthy acceleration imposed on the sense element 22 is recorded 124. Then, the time ($T_2$) at which the activation flag 28 changes state to send an activation signal to the passenger restraint 30 is recorded 126. The time interval ($T_2 - T_1$) is the expected response time of the impact sensor 128. This expected response time is stored in the non-volatile programmable memory 130 through the microprocessor interface. Then, after the sensor is installed in a vehicle, when the self-test circuit 36 initiates the self-test sequence, the expected response time can be compared to the current response time and a difference greater than a predetermined allowable amount between the two time intervals will show a fault within the impact sensing system.

While the best mode for carrying out the invention has been described in detail, those familiar with the art to which this invention relates will recognize various alternative designs and embodiments for practicing the invention as defined by the following claims.

I claim:

1. A method for calibrating an impact sensor that controls the activation of a passenger restraint mechanism in a vehicle, the method comprising the steps of:
   providing, within the sensor, a sense element that is responsive to acceleration, means for generating an electrical signal having a value that is a function of the sense element response, and an activation decision circuit having a counter means for determining if the electrical signal is indicative of a passenger restraint activation worthy event;
   applying an acceleration to the sense element between a rate of zero acceleration and a full scale acceleration;
   incrementally adjusting the acceleration applied to the sense element;
   programming the generating means to adjust the value of the electrical signal within a predetermined range for each incremental acceleration value; and
   verifying the calibration of the impact sensor.

2. The method of claim 1 wherein the verifying step comprises the steps of:
   measuring the electrical signal value at zero acceleration;
   measuring the electrical signal value at full scale acceleration;
   measuring the electrical signal value for at least one acceleration that is between zero acceleration and full scale acceleration; and
   verifying that the relationship between the electrical signal value and acceleration is substantially linear.

3. The method of claim 1 wherein the verifying step comprises the steps of:
   measuring the electrical signal value at zero acceleration;
   incrementally increasing the acceleration;
   measuring the value of the electrical signal at each increment;
   establishing a bias point based upon the electrical signal value at zero acceleration;
   computing a least squares line based upon the measured values and having its intercept through the bias point; and
   computing a difference between each measured value and the least squares line wherein the impact sensor is out of tolerance if the difference exceeds a predetermined value, thereby indicating a non-linear relationship between the electrical signal value and the acceleration sensed by the sense element.

4. The method of claim 1 further comprising the step of providing security codes within the generating means in the impact sensor to thereby prevent unauthorized tampering.

5. The method of claim 1 wherein the programming step further comprises programming the generating means while the sense element is still undergoing acceleration.

6. The method of claim 1 further comprising the steps of:
   providing a self-test circuit;
   simulating acceleration of the sense element at a first time;
   determining a second time at which the electrical signal is indicative of a passenger restraint activation worthy event;
   calculating the difference between the first time and second time; and
   programming the self-test circuit with the difference.

7. The method of claim 1 further comprising completely manufacturing the sensor prior to conducting the calibration.

8. The method of claim 1 further comprising the step of programming the activation decision circuit to indicate a passenger restraint activation worthy event when the value of the electrical signal reaches a predetermined value.

9. The method of claim 4 wherein the programming step comprises loading a second value into the activation decision circuit that is equal to the total size of the counter means minus the desired value of the electrical signal, to thereby indicate a passenger restraint activation worthy event when the counter means reaches the second value within a predetermined period of time.

10. A method for calibrating an impact sensor that controls the activation of a passenger restraint mechanism in a vehicle, the method comprising the steps of:
    providing, within the sensor, a sense element that is responsive to acceleration, means for generating an electrical signal having a pulse density which is a function of the sense element response, and an activation decision circuit having a counter for determining if the electrical signal is indicative of a passenger restraint activation worthy event;
    applying an acceleration to the sense element between a rate of zero acceleration and full scale acceleration;
    incrementally adjusting the acceleration applied to the sense element;
    programming the generating means to adjust the pulse density of the electrical signal within a predetermined range for each incremental acceleration value; and
    verifying the calibration of the impact sensor.

11. The method of claim 10 wherein the verifying step comprises the steps of:
    measuring the pulse density of the electrical signal at zero acceleration;
    measuring the pulse density of the electrical signal at full scale acceleration;
    measuring the pulse density of the electrical signal for at least one acceleration that is between zero acceleration and full scale acceleration; and
    verifying that the relationship between the electrical signal pulse density and acceleration is substantially linear.

12. The method of claim 10 wherein the verifying step comprises the steps of:
    measuring the pulse density of the electrical signal at zero acceleration;
    incrementally increasing the acceleration;

measuring the pulse density of the electrical signal at each increment;

establishing a bias point based upon the pulse density of the electrical signal at zero acceleration;

computing a least squares line that is based upon the measured pulse densities and having its intercept through the bias point; and computing a difference between each measured value and the least squares line wherein the impact sensor is out of tolerance if the difference exceeds a predetermined value, thereby indicating a non-linear relationship between the electrical signal pulse density and the acceleration sensed by the sense element.

13. The method of claim 10 further comprising completely manufacturing the sensor prior to conducting the calibration.

14. The method of claim 10 wherein the programming step further comprises programming the generating means while the sense element is still undergoing acceleration.

15. The method of claim 10 further comprising the steps of:

providing a self-test circuit;

simulating acceleration of the sense element at a first time;

determining a second time at which the electrical signal is indicative of a passenger restraint activation worthy event;

calculating the difference between the first time and second time; and programming the self-test circuit with the difference.

16. The method of claim 10 further comprising the steps of:

incrementally increasing the acceleration applied to the sense element up to a predetermined maximum value;

noting the pulse density at each increment;

incrementally decreasing the acceleration applied to the sense element;

comparing the pulse density at each increment while decreasing acceleration to the pulse density at corresponding increments noted during increasing acceleration and noting a difference in pulse density wherein the impact sensor is out of tolerance if the difference in pulse densities exceeds a predetermined value.

17. The method of claim 10 further comprising the step of programming the activation decision circuit to indicate a passenger restraint activation worthy event when the pulse density of the electrical signal reaches a predetermined value.

18. The method of claim 17 wherein the programming step comprises loading a second value into the activation decision circuit counter that is equal to the total size of the counter minus the desired number of pulses in the electrical signal, to thereby indicate a passenger restraint activation worthy event when the counter reaches the second value within a predetermined period of time.

* * * * *